United States Patent
Sofia

(10) Patent No.: US 12,442,210 B1
(45) Date of Patent: Oct. 14, 2025

(54) SWIMMING POOL UNDER-COVER PADDING ATTACHMENT SYSTEM AND CLIP PROVIDED THEREFOR

(71) Applicant: Pool Cover Corporation, Hauppauge, NY (US)

(72) Inventor: Michael Sofia, Holbrook, NY (US)

(73) Assignee: Pool Cover Corporation, Hauppauge, NY (US)

( * ) Notice: Subject to any disclaimer, the term of this patent is extended or adjusted under 35 U.S.C. 154(b) by 200 days.

(21) Appl. No.: 18/368,533

(22) Filed: Sep. 14, 2023

(51) Int. Cl.
*E04H 4/10* (2006.01)

(52) U.S. Cl.
CPC ..................................... *E04H 4/10* (2013.01)

(58) Field of Classification Search
CPC ..... E04H 4/10; E04H 4/14; E04H 4/16; F16B 5/0692; F16B 5/0635; F16B 5/0642; F16B 5/0657
See application file for complete search history.

(56) References Cited

U.S. PATENT DOCUMENTS

| | | | |
|---|---|---|---|
| 3,373,464 A * | 3/1968 | Ausnit | ................. E04H 4/10 24/399 |
| 4,379,351 A | 4/1983 | Hinsperger | |
| 5,095,557 A | 3/1992 | Keyes | |
| 5,134,730 A * | 8/1992 | Vandis | ................. E04H 4/14 5/663 |
| D359,224 S | 6/1995 | Airey | |
| 5,421,041 A | 6/1995 | Stern | |
| D373,068 S | 8/1996 | Airey | |
| 5,608,926 A | 3/1997 | Donaton | |
| D381,369 S | 7/1997 | Sabadina | |
| 6,662,383 B2 | 12/2003 | Cornelius et al. | |
| 6,691,334 B2 | 2/2004 | St-Hilaire | |
| D491,447 S | 6/2004 | Diss | |

(Continued)

FOREIGN PATENT DOCUMENTS

| | | |
|---|---|---|
| DE | 10008102 C1 | 6/2001 |
| EP | 1674640 A2 | 6/2006 |

(Continued)

OTHER PUBLICATIONS

Poolmaster_CoverCatch_www.swimoutlet.com_Sep. 11, 2023_1pg.

(Continued)

*Primary Examiner* — Erin Deery
(74) *Attorney, Agent, or Firm* — Michael J Porco; Gerald E Hespos

(57) ABSTRACT

A J-shaped clip attaches a thin flexible protective substrate layer under a conventional fabric pool cover, to protect the pool cover from abrasions and related ripping of the pool cover, caused by wintry weather and weight of debris, leaves, rain, snow, and ice. The J-shaped clip has a flat adhesive section to which the thin but durable padding flexible substrate is attached. The rearward extending curve of the head of the clip is non-adhesive and has pressure point ribs, so that the distal edges of the actual swimming pool cover fit by friction fit force with that rearward extending curve of the head of the J-shaped clip. Multiple clips are attached to the outer edge framing of the pool cover about every 4 or 6 feet and they are applied along the entire 4-sided perimeter of the pool, until equally distributed about the entire perimeter of the fabric pool cover.

10 Claims, 5 Drawing Sheets

(56) References Cited

U.S. PATENT DOCUMENTS

| | | |
|---|---|---|
| D494,631 S | 8/2004 | Douziech |
| D531,250 S | 10/2006 | Peterson |
| D535,717 S | 1/2007 | Peterson |
| 7,374,141 B2 * | 5/2008 | Holden ................ F16B 5/0692 |
| | | 248/205.2 |
| D696,205 S | 12/2013 | Woodlief |
| 8,683,621 B1 | 4/2014 | Gustason |
| D730,719 S | 6/2015 | Sundberg |
| D742,728 S | 11/2015 | Ostler |
| 9,777,496 B2 | 10/2017 | Karales |
| 10,550,592 B2 | 2/2020 | Coenraets |
| 10,619,368 B2 | 4/2020 | Steinbauer et al. |
| 10,876,309 B2 * | 12/2020 | Lewis ..................... E04H 4/10 |
| D984,871 S | 5/2023 | Galvan |
| D1,021,086 S | 4/2024 | Emerson |
| 2003/0037370 A1 | 2/2003 | Cato |
| 2008/0060124 A1 | 3/2008 | Blackman et al. |
| 2011/0000013 A1 | 1/2011 | Elnar |
| 2013/0298325 A1 | 11/2013 | Preuit |
| 2018/0363314 A1 * | 12/2018 | Duvall ..................... E04H 4/06 |

FOREIGN PATENT DOCUMENTS

| | | |
|---|---|---|
| EP | 2623691 B1 | 5/2014 |
| FR | 2637643 B1 | 2/1995 |
| FR | 3047033 B1 | 3/2019 |
| KR | 200249216 Y1 | 11/2001 |

OTHER PUBLICATIONS

DEI_CoverGuard_www.poolsuppliessuperstore.com_Sep. 11, 2023l_ 3pgs.

BoatCoverClip_Premier_Pontoon_rochfordsupply.com_Sep. 11, 2023_ 3pgs.

poolandspa.com_LoopLoc.

* cited by examiner

SWIMMING POOL UNDER-COVER PADDING ATTACHMENT SYSTEM AND CLIP PROVIDED THEREFOR

FIELD OF THE INVENTION

The present invention relates to an under-cover abrasion preventing padding system and attachment clip for swimming pool covers.

BACKGROUND OF THE INVENTION

Fabric swimming pool covers, such as manufactured by Applicant Pool Cover Corporation herein, are subject to abrasions and possible tearing over the non-use seasons of Autumn, Winter, and Spring, when the pool cover is pushed down by wintry weather and weight of debris, leaves, wind, rain, snow, and ice. Although in decent cold season weather, the swimming pool cover is positioned by a gap above the textured coping along the edge of swimming pool deck, during adverse weather conditions, the fabric pool cover is pushed down against the textured coping.

Therefore, Prior Art FIG. 1A shows the space gap 60 normally provided in calm weather conditions, to accommodate the straps, protective plastic wear strips on webbing, spring clasps and fasteners attachable to permanent deck anchors in the pool deck between the bottom of the pool cover and the top of the swimming pool deck.

However the space gap 60 is compromised during adverse wintry weather condition, where the additional force of the wind and weight of leaves, debris, snow and/or ice pushes down on the pool cover 30, so that the pool cover 30 contacts the normally abrasive textured perimeter of the pool deck, which often rips the pool cover 30 while being subject to those adverse weather downward forces and weight.

To prevent abrasions or tearing, it is known to provide a thin flexible protective substrate layer under a conventional fabric pool cover, to protect the pool cover from abrasions and related ripping of the pool cover, caused by wintry weather and weight of debris, leaves, rain, snow, and ice. Such thin flexible protective substrate padding layers are typically 18 mils in thickness and are sold by the Applicant under the tradename "Coated Pool Cover 15 Rip-Stop". Prior Art FIG. 1 shows the prior art undercover padding film 120, which is folded over at its distal end 121, and punctured with holes 122 to accommodate the spring clasps 43 and straps 44 holding the pool cover 30 to corresponding permanent anchor fasteners 46 in the swimming pool deck 40.

However, such Prior Art Under Cover Padding substrates 120 are unsightly with punctured holes 122, which, by themselves can rip and compromise the cushioning of the pool cover 30 during adverse Winter weather, as noted above.

OBJECTS OF THE INVENTION

Loop-Loc®'s Clip-Loc™ system is therefore designed to make a semi-permanent attachment of a vinyl sheet to the underside of a Loop-Loc pool cover. This vinyl sheet functions to protect the pool cover from abrasion caused by the pool's decking surface.

Installation of the system is done after the pool cover has been installed. This allows for ease of use and accuracy of placement. The Clip-Loc™ clip retains the padding sheet in its proper position by making the attachment onto the pool cover's webbing frame.

After the pool covering season, the padding can be removed from the pool cover, which allows for ease of handling. Since the padding system can add substantial weight to the cover, removal is beneficial.

Reinstallation in subsequent years is accomplished by repositioning the padding after cover reinstallation.

Since the padding components are separate from the cover, worn padding can easily be replaced as required.

SUMMARY OF THE INVENTION

In keeping with these objects and others which may become apparent, the present invention is in combination, a swimming pool cover and clips for securing a flexible protective substrate layer to the cover, wherein:
 a) the pool cover is connected to the pool deck using spaced straps along a perimeter of the cover having distal ends of the straps attached to the deck of the pool for covering the pool during long periods of disuse including winter;
 b) the flexible protective substrate layer under areas of the pool cover covering a complete perimeter of the pool including coping thereof; and,
 c) a means for removably securing the substrate layer in place, the means comprising a plurality of the clips connected to the edge areas of the substrate layer and clipped to edge areas of the pool cover; and
 d) whereby the substrate layer prevents abrasions and tearing of the pool cover adjacent the coping.

Preferably, the clips are J-shaped, being in the shape of a sans-serif capital alphabetical letter "J", with a straight section and a curved return folded over section. The straight section has a flat surface with adhesive thereon for releasable attachment to the substrate layer.

Each of the J-shaped clips is flexibly spring loaded and has the aforementioned folded over curved return portion adjacent the flat surface with adhesive and spaced from the adhesive, wherein interior, facing surfaces of the folded over curved return portion have pressure point nibs for engaging an edge area of the pool cover forming a friction fit force for removably securing the J-shaped clip to the cover.

The flexible protective substrate layer has a width sufficient to cover the pool coping edge, wherein the width of the substrate layer is about 30 inches which allows installation of the substrate layer to be made after the cover is installed over the pool.

Preferably, the flexible protective cover layer has a thickness of about 18 mils. Also preferably, the flexible protective cover layer is a cushion padding high adhesion vinyl with a woven rip-stop base fabric for high tear and tensile strength to minimize punctures, reduce zipper tears, and increase safety, the flexible protective cover being treated with UV and anti-mildew to lessen color fading and degradation, while resisting mold and mildew.

The present invention is also a method of protecting a swimming pool cover comprising the steps of:
 e) installing the pool cover over the pool using spaced straps along a perimeter of the cover, with distal ends of the straps attached to a deck of the pool for covering the pool during long periods of disuse including winter;
 f) inserting a flexible protective substrate layer under edge areas of the pool cover covering a complete perimeter of the pool including coping thereof;
 g) securing the substrate layer in place using a plurality of the clips connected to edge areas of the substrate layer and clipped to edge areas of the pool cover; and h) whereby the substrate layer prevents abrasions and tearing of the pool cover adjacent the coping.

Preferably the clips are J-shaped in the shape of a sans-serif alphabetical capital letter "J", wherein each clip has a flat surface with adhesive thereon, including the step of releasably attaching an edge of the substrate layer to the adhesive on each of the clips. Also preferably, each of the J-shaped clips is flexibly spring loaded and has a folded over curved return portion adjacent the flat surface with adhesive and spaced from the adhesive, wherein interior, facing surfaces of the folded over curved return portion are free of adhesive and have pressure point ribs, for engaging an edge area of the pool cover to secure the edge area of the pool cover.

The pool cover is engageable within said J-shaped clips when placed over a swimming pool in seasonal cold weather use and removable from said J-shaped clips for separate storage of said pool cover during periods of non-use and storage in warm swimming weather.

The method also includes the step of providing the substrate layer has a width sufficient to cover the pool coping edge, wherein the width of the substrate layer is about 30 inches which allows installation of the substrate layer to be made after the cover is installed over the pool.

Additionally, preferably the flexible protective cover layer is provided in a thickness of about 18 mils.

The method also includes the step of providing the flexible protective cover layer is a cushion padding high adhesion vinyl with a woven rip-stop base fabric for high tear and tensile strength to minimize punctures, reduce zipper tears, and increase safety, wherein the flexible protective cover layer is treated with UV and anti-mildew to lessen color fading and degradation, while resisting mold and mildew.

The present invention also includes a J-shaped clip in the shape of an alphabetical capital letter "J", including:
 a substantially rectangular shaped rigid sheet material;
 the rigid sheet material having a folded over curved return portion along one end thereof;
 one face of the rigid sheet material adjacent the folded over curved return portion having a releasable adhesive for engaging an edge area of a first sheet material;
 facing surfaces of the folded over curved return portion being free of adhesive;
 the facing surfaces having pressure point ribs for engaging an edge area of a second sheet material; wherein the ribs can extend side to side, or partially, or optionally be individual nibs;
 whereby the J-shaped clip is flexibly spring loaded and is capable of releasably connecting two sheets of material.

The face of the J-shaped clip having the releasable adhesive is on the same side of the clip as the folded over curved return portion, whereby the connected sheets of material are separated and extend from the clip in the same direction.

Related thereto, the clip has a releasable cover layer on the releasable adhesive prior to use of the clip.

BRIEF DESCRIPTION OF THE DRAWINGS

The present invention can best be understood in connection with the accompanying drawings. It is noted that the invention is not limited to the precise embodiments shown in the following drawings, in which:

FIG. 8 also shows the J-shaped attachment clip in place before attachment to the exposed portion of the protective padding cushion substrate layer.

DETAILED DESCRIPTION OF THE INVENTION

Figure 1:
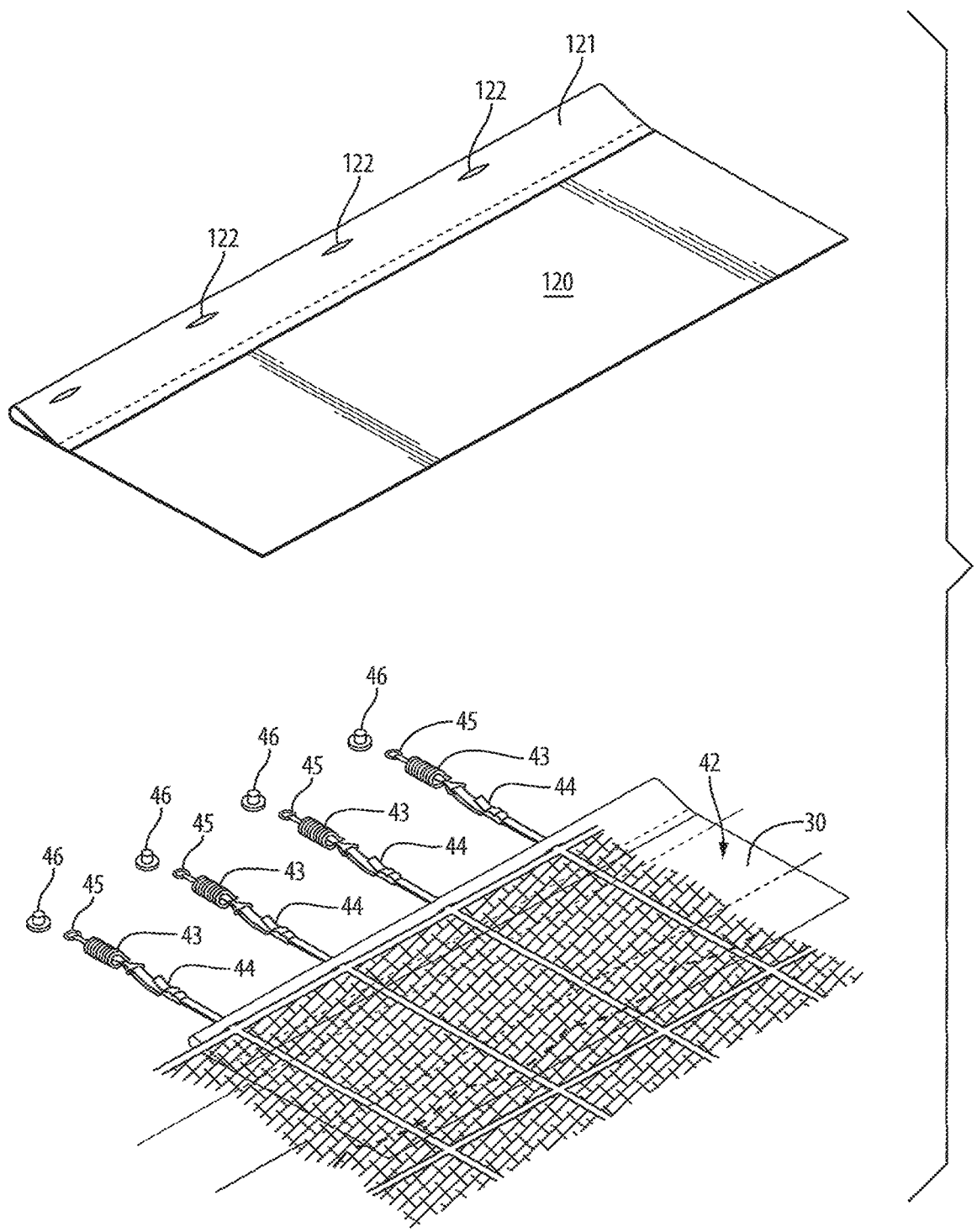
FIG. 1 is an exploded perspective view of a Prior Art padding system for being positioned under fabric swimming pool covers.

As used throughout this specification, the word "may" used in a permissive sense (i.e., meaning having the potential to, or being optional), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that the citing of any reference within this disclosure, i.e., any patents, published patent applications, and non-patent literature, is not an admission regarding a determination as to its availability as prior art with respect to the herein disclosed and claimed apparatus/method.

Furthermore, any reference made throughout this specification to "one embodiment" or "an embodiment" means that a particular feature or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

According to the present invention, a J-shaped clip 1 is used to attach a thin flexible protective substrate layer 20 under a conventional fabric pool cover 30, to protect the pool cover 30 from abrasions and related ripping of the pool cover 30 against a textured, abrasive pool deck coping 42 of a swimming pool deck 40 surrounding a pool 50, caused by wintry weather and downward force of the weight of debris, leaves, rain, snow, and ice against the pool cover 30.

The J-shaped clip 1, includes a flat base portion 2 which has a curved elevated return portion 3. Within the curved elevation portion 3, there is provided a hollow cavity 4 having a plurality of pressure point ribs 5, so that the distal edges 31 of the reinforced perimeter framing material 32 of an actual swimming pool cover 30 fit by friction fit force within the hollow cavity 4 of the rearward extending curve 3 of the head of the J-shaped clip 1. The flat based portion 2 includes an adhesive section 6 to which the thin but durable padding flexible substrate layer 20 is attached. The rearward extending curve 3 of the head 7 of the J-shaped clip 1 is non-adhesive and has the pressure point ribs 5 on the upper and lower surfaces 8, 9 of the hollow cavity 4, so that the distal edges 31 of the actual swimming pool cover 30 fit by friction fit force within that rearward extending curve 3 of the head 7 of the J-shaped clip 1.

The J-shaped clip 1 is not large. It is preferably about 3.25 inches in length and about 2 inches in width (although dimensions may vary). The return curved portion 3 of the J-shaped clip 1 that grips the edges 31 of the reinforced perimeter framing material 32 of the pool cover 30 therein is preferably about 0.8750 inches long.

The thin flexible preferable opaque protective plastic padding film substrate layer 20 is preferably about 22 feet 6 inches wide by preferably about 30 inches depth. The 22-foot dimension width gets cut down as needed but the length of the film substrate layer 20 is always about 30 inches because an extension is needed beyond the typical 15-24 inches of the pool cover 30 over the coping 42 of the pool deck 40.

Multiple J-shaped clips 1, 1, 1, etc., are attached to the outer edge framing 32 of the pool cover 30 about every 4 or 6 feet and they are applied along the entire four-sided perimeter of the pool cover 30, until equally distributed about the entire perimeter of the fabric pool cover 30.

The purpose of the flexibly spring loaded J-shaped clip 1 is to keep the thin (12-18 mils) protective, flexible, thin, padding substrate layer 20 attached by the J-shaped clip 1 to the pool cover edge framing material 32, which is held firmly in place within the concavity 4 within the folded over curved return portion 3 of the J-shaped clip 1, which has a plurality of pressure point domed or otherwise shaped ribs 5 to enhance the friction fit therein.

The pool cover is engageable within said J-shaped clips when placed over a swimming pool in seasonal cold weather use and removable from said J-shaped clips for separate storage of said pool cover during periods of non-use and storage in warm swimming weather.

The opposite end 21 of the thin but durable padding flexible substrate layer 20 lays loose over the inner edge of the pool deck 40 surrounding the swimming pool 50.

Figure 1A:
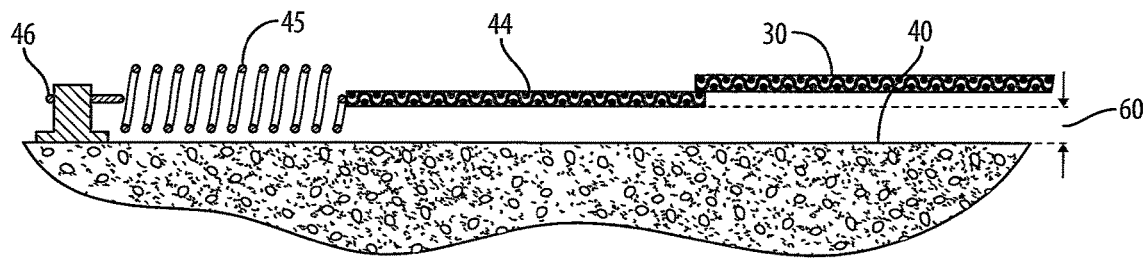
FIG. 1A is a close-up side cross sectional view of a prior art swimming pool cover installed over a swimming pool and swimming pool deck, during calm weather conditions, without any wintry weather forces pushing down on the pool cover, where a gap space is normally provided below the swimming pool over and above the pool deck, to accommodate the height of the pool fastening spring clasps 43, fastening straps 44, protective plastic wear strips on webbing and fastening rings or hooks 45, that tightly engage protruding rings or hooks anchors 46 permanently affixed to the pool deck 40.
Figure 2:
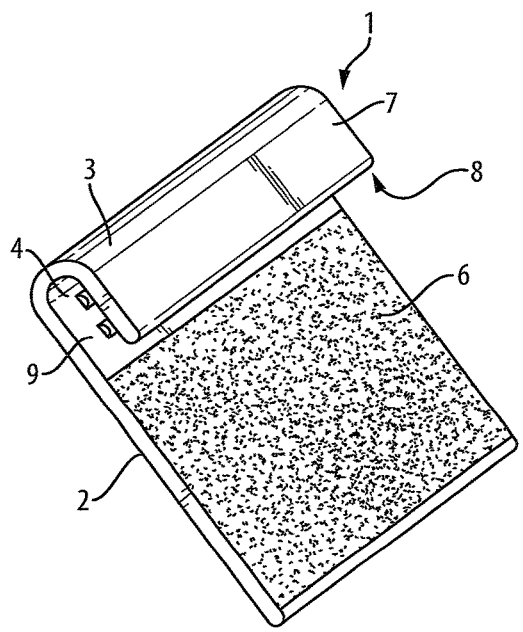
FIG. 2 is a perspective view of the attachment J-shaped clip of the present invention, showing an adhesive layer for attaching the clip to a protective padding cushion substrate layer under the pool cover.
Figure 3:
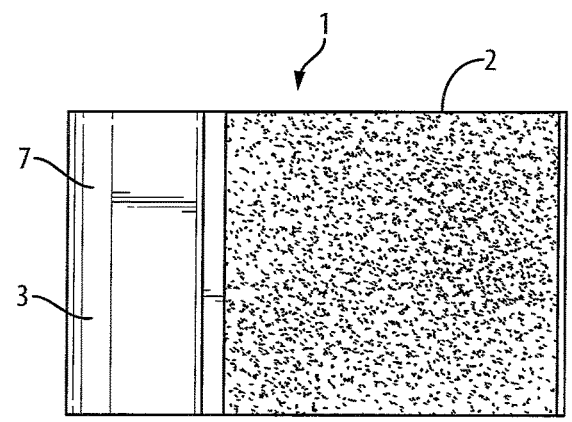
FIG. 3 is a top plan view thereof shown with a release layer over the adhesive.
Figure 4:
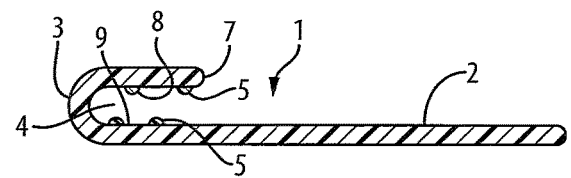
FIG. 4 is a side view thereof in cross section.
Figure 5:
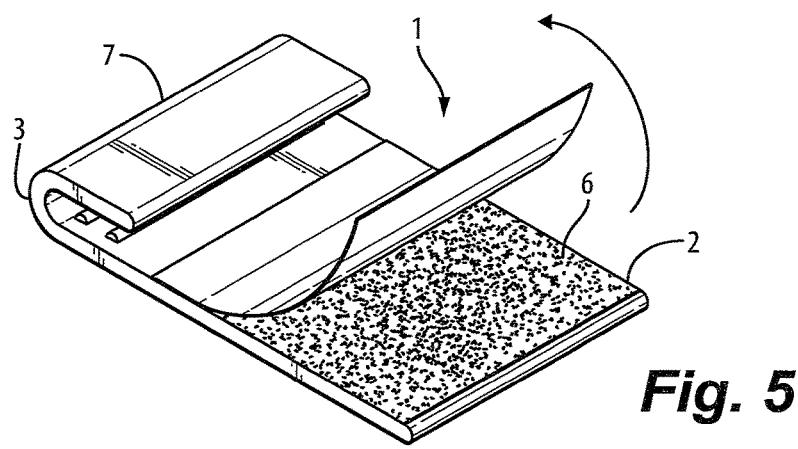
FIG. 5 is a perspective view thereof showing the release liner in place over the adhesive layer on the J-shape clip.
Figure 6:
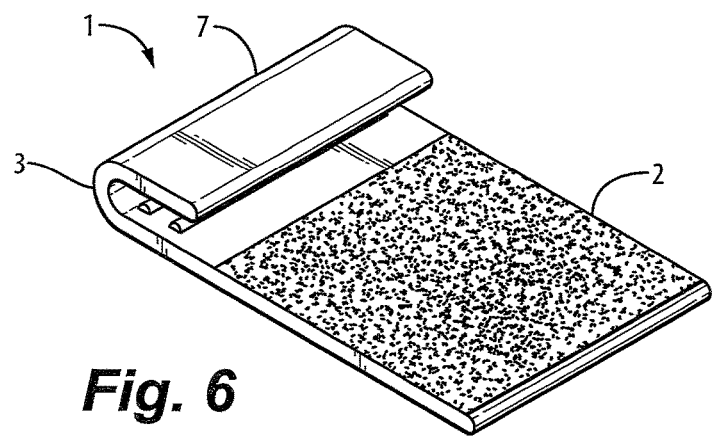
FIG. 6 is a perspective view of the J-shaped clip, with the adhesive shown exposed on a top portion thereof.
Figure 7:
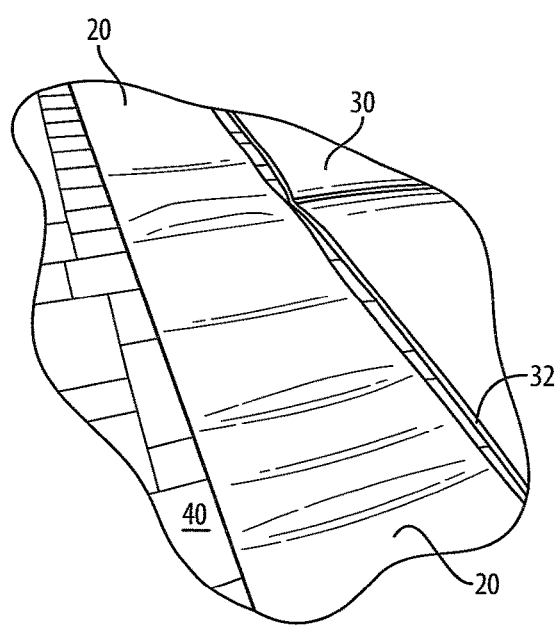
FIG. 7 is an overall environmental view showing a section of the protective padding cushion substrate layer aligned next to the pool cover frame edge, before insertion thereunder.
Figure 8:
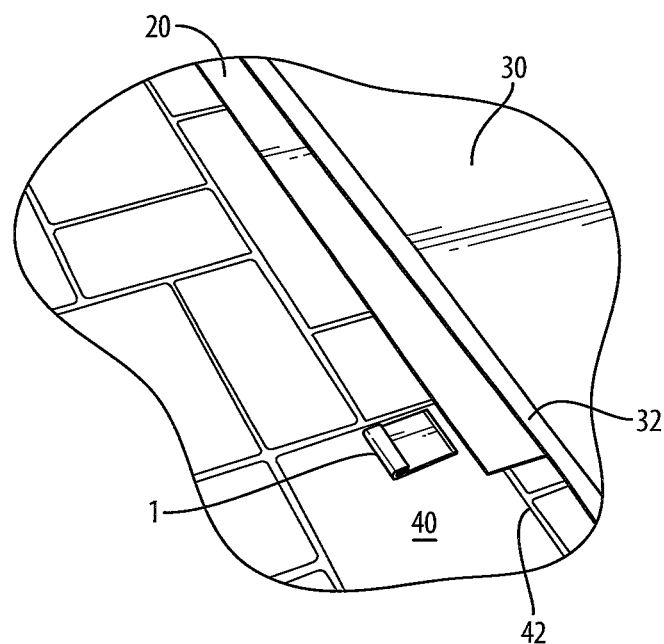
FIG. 8 is an overall environmental view as in FIG. 7, showing the protective padding cushion substrate layer inserted further under the fabric pool cover, with an exposed portion of about 3 to 4 inches.
Figure 9:
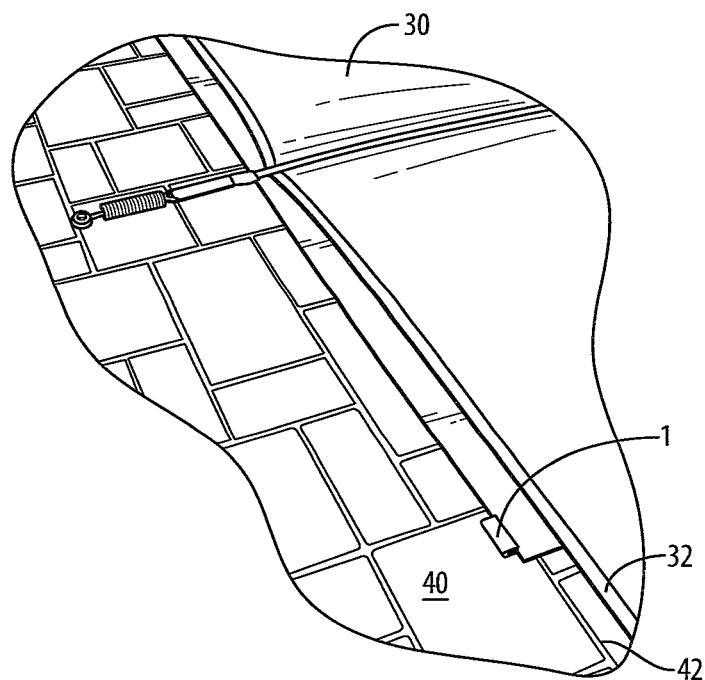
FIG. 9 is a close-up perspective view which shows the J-shaped attachment clip attached by the adhesive layer to the exposed portion of the protective padding cushion substrate layer.
Figure 10:
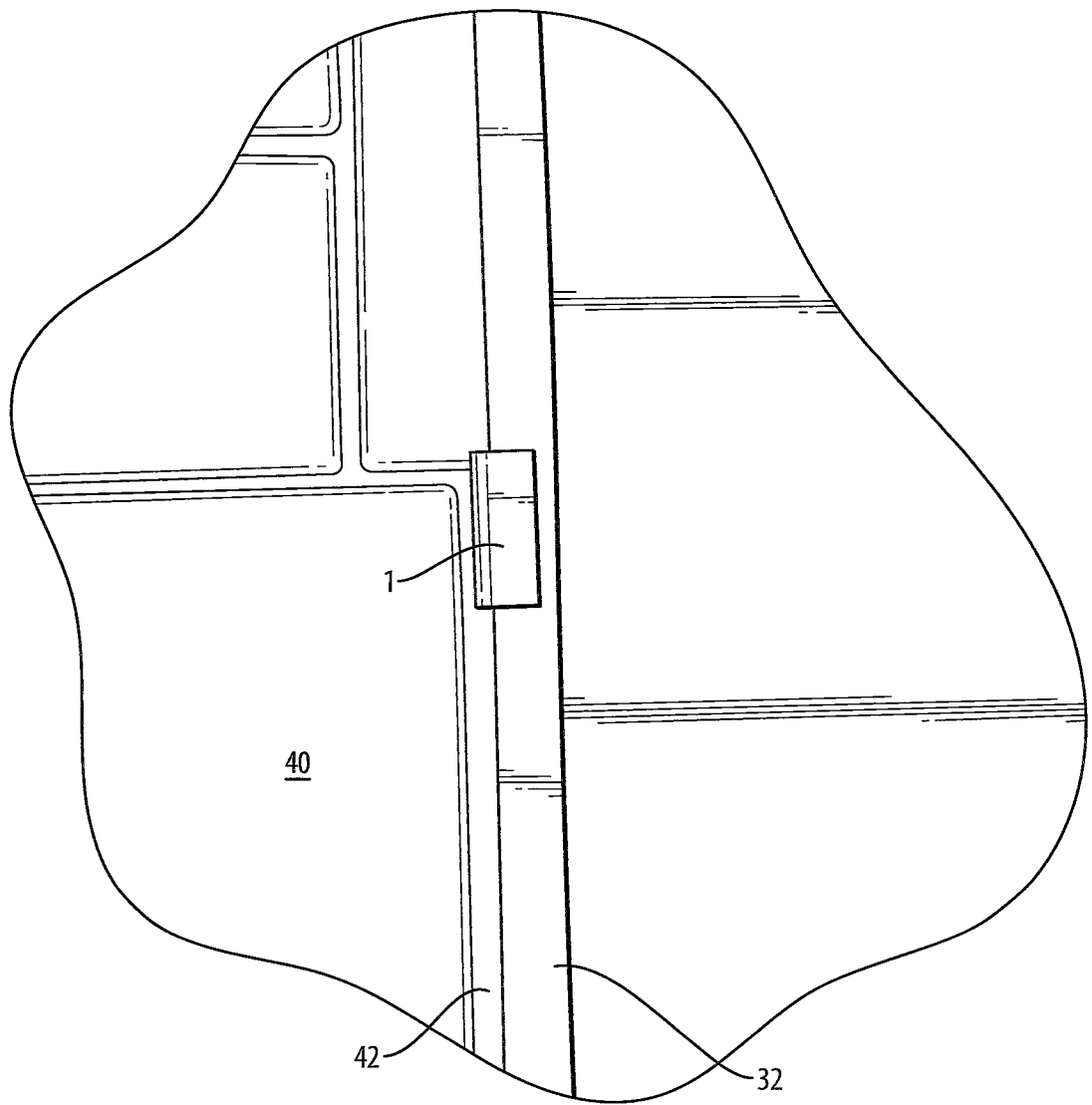
FIG. 10 is a close-up top plan view which shows the J-shaped attachment clip in place, where the folded over curved return section of the J-shaped clip overlays a portion of the fabric edge framing of the pool cover, so that the end of the J-shaped padding cushion is axially aligned and in positional register with the distal outer edge of the fabric edge framing of the pool cover.

As shown in FIG. 1A, during calm weather conditions, without any wintry weather forces pushing down on the pool cover 30, the protective cushion padding substrate layer 20 is normally provided in the usual gap space 60 provided by the height of the pool fastening clasps 43, fastening straps 44, protective plastic wear strips on webbing and receptacle rings and hooks 45, that tightly engage anchors 46 permanently affixed to the pool deck 40. That is why it is easy to install the protective cushion padding substrate layer 20 under an already installed pool cover 30, in the gap space 60 provided between the pool cover 30 and the solid textured coping 42 of the pool deck 40.

The thin black flexible substrate layer 20 that is adhesively attached by adhesive 6 to the flat based portion 2 of the J-shaped clip 1, actually extends out 30 inches from the J-shaped clip 1, because it has to extend beyond the portion of the actual pool cover 30, over the abrasive edge of the pool deck coping 42 of the pool deck 40.

Most pool covers 30 extend 15 to 18 inches outward beyond the edge of the pool 50 and some irregular curved pools require that the pool cover 30 extend 24 inches outward beyond the abrasive pool coping edge 42 of the pool deck 40.

The distal end of the thin protective cushion flexible padding substrate layer 20 is suspended loose over the pool side of the coping 42. It does not matter whether it is suspended in air or water beyond the pool side of the coping 42 since its main purpose is to protect the pool cover from the abrasive coping edge 42 of the pool deck 40.

However, as noted above, often in bad or wintry weather, the fabric of the pool cover 30 is pushed down within the gap 60 between the pool cover 30 and the deck 40 by the downward forces and weight of by wind, rain, snow, ice, or debris (leaves) against the pool deck 40. The distal end 21 of the thin, flexible padding substrate layer 20 within the J-shaped clip 1 is meant to cushion the bottom of the pool cover 30 if it is pushed downward against the abrasive coping 42 of the pool deck 40, by the aforementioned wind, rain, snow, ice or debris (leaves) against the pool deck 40 which usually has a textured surface so that swimmers don't slip when they are walking on the deck at the edge of the pool 50.

Coated Pool Cover 15 Rip-Stop Material:

The flexible cushion padding substrate layer 20 is preferably sold under the tradename name of Value Vinyls Coated Pool Cover 15 Rip-Stop, which is a solid, knife coated, high adhesion vinyl designed for 100% pool coverage. Coated Pool Cover 15 Rip-Stop has been designed with a unique woven rip-stop base fabric for extremely high tear and tensile strength to minimize punctures, reduce zipper tears, and increase safety. It is treated with UV and anti-mildew to lessen color fading and degradation, while resisting mold and mildew. It has a thickness of 18.0 mil.

J-shaped clips 1 (tradename "Clip Loc™") are used to secure the flexible cushioning padding substrate layer 20 under the stretched-out fabric pool cover 30. The actual fabric Pool Cover 30 must be installed and properly tensioned before the flexible cushion padding substrate layer 20 can be installed thereunder, and above the abrasive textured pool deck edge coping 42. Each padding roll 23 of the substrate layer 20 is 22'6" long by 30" wide. While quantities may vary, typically Six J-shape clips 1, 1, 1 etc., are included with each roll 23 for installation.

Installation Instructions

The following Instructions are provided for the method of providing the J-shaped clips 1, 1, 1, etc. to the flexible padding substrate layer 20, for fastening the flexible padding substrate layer 20 to the framing perimeter edge material 32 of the swimming pool cover 30.

1. Unroll a section of padding 20 (22'6" long by 30" wide). Be sure to keep padding 20 flat.
2. Slide the padding 20 under the edge of the pool cover 30, leaving a 4" distal portion 24 outside of the pool cover 30. Position the padding 20 between the pool cover 30 and decking 40, leaving approximately 4" of padding 20 exposed.
3. Remove the paper backing 6a from the adhesive 6 on the J-shaped clip 1. Starting at one end of the padding 20, lift padding 20 slightly and slide the J-shaped clip 1 beneath padding 20 until the adhesive 6 is completely covered.
4. Press down on the padding 20 to adhere the padding 20 to the J-shaped clip1. Repeat this process for the remaining J-shaped clips 1, 1, 1 etc., spacing them approximately 4'6" apart along the perimeter of the pool cover 30. The last J-shaped clip 1 should be at the other end of the padding 20.
5. Slide the J-shaped clips 1, 1, 1 etc., and padding 20 under the fabric pool cover 30 until the padding 20 is completely under the frame edge material of the pool cover 30 and the J-shaped clip 1 is secured to the reinforced frame edge of the pool cover, within the non-adhesive rearward facing bend of the J-shaped clip 1. Pressure point ribs are in the folded over curved return portion of the J-shaped clip 1 to enhance gripping of the edge of the pool cover framing 32 therein.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. In combination, a swimming pool cover and clips for securing a flexible protective substrate layer to said swimming pool cover, comprising:
   said swimming pool cover connected to a pool using spaced straps along a perimeter of said swimming pool cover having distal ends of said straps attached to a deck of said pool for covering said pool during periods of disuse including winter;
   said flexible protective substrate layer under areas of said swimming pool cover covering a complete perimeter of said pool including a pool edge coping thereof;
   means for removably securing said substrate layer in place comprising a plurality of said clips connected to respective edge areas of said substrate layer and clipped to further respective edge areas of said swimming pool cover; and
   whereby said flexible protective substrate layer prevents abrasions and tearing of said swimming pool cover adjacent said pool edge coping;
   wherein said clips are J-shaped and each has a flat surface with adhesive thereon for releasable attachment to said flexible protective substrate layer;
   in which each of said J-shaped clips is flexibly spring loaded and has a folded over curved return portion, adjacent to the flat surface with adhesive and spaced from said adhesive, wherein interior, facing surfaces of said folded over curved return portion have pressure point ribs for engaging an edge area of said swimming pool cover forming a friction fit force for removably securing said J-shaped clip to said cover; and said swimming pool cover is engageable within said J-shaped clips when placed over said swimming pool in seasonal winter weather use and removable from said J-shaped clips for separate storage of said swimming pool cover during periods of non-use and storage in seasonal summer swimming weather.

2. The combination of claim 1, in which said flexible protective substrate layer has a width sufficient to cover said pool edge coping.

3. The combination of claim 2, wherein the width of said flexible protective substrate layer is about 30 inches which allows installation of said flexible protective substrate layer to be made after said swimming pool cover is installed over said pool.

4. The combination of claim 1 further comprising said flexible protective substrate layer having a thickness of about 18 mils.

5. The combination of claim 1 wherein said flexible protective substrate layer is a cushion padding adhesion resistant vinyl with a woven rip-stop base fabric for tear resistance and tensile strength resistant to punctures, resistant to zipper tears, and to promote safety, said flexible protective cover being treated with UV and anti-mildew to resist color fading and degradation, while resisting mold and mildew.

6. A method of protecting a swimming pool cover comprising the steps of:
   installing said swimming pool cover over said pool using spaced straps along a perimeter of said swimming pool cover, with distal ends of said straps attached to a deck of said pool for covering said pool during periods of disuse including winter;
   inserting a flexible protective substrate layer under respective edge areas of said swimming pool cover covering a complete perimeter of said pool including a pool edge coping thereof;
   removably securing said flexible protective substrate layer in place using a plurality of said clips connected to said edge areas of said flexible protective substrate layer and clipped to said edge areas of said swimming pool cover; and
   whereby said flexible protective substrate layer prevents abrasions and tearing of said swimming pool cover adjacent said pool edge coping;
   wherein said clips are J-shaped and each has a flat surface with adhesive thereon, including the step of releasably attaching an edge of said flexible protective substrate layer to said adhesive on each of said clips;
   in which each of said J-shaped clips is flexibly spring loaded and has a folded over curved return portion adjacent said flat surface with adhesive and spaced from said adhesive, wherein interior, facing surfaces of said folded over curved return portion are free of adhesive and have pressure point ribs, for engaging an edge area of said swimming pool cover to secure said edge area of said swimming pool cover; and said swimming pool cover is engageable within said J-shaped clips when placed over a swimming pool in seasonal winter weather use and removable from said J-shaped clips for separate storage of said swimming pool cover during periods of non-use and storage in seasonal summer swimming weather.

7. The method of claim 6, in which said flexible protective substrate layer has a width sufficient to cover said pool edge coping.

8. The method of claim 7, wherein the width of said flexible protective substrate layer is about 30 inches which allows installation of said flexible protective substrate layer to be made after said swimming pool cover is installed over said pool.

9. The method of claim 6 further providing said flexible protective substrate layer in a thickness of about 18 mils.

10. The method of claim 6 wherein said flexible protective substrate layer is a cushion padding adhesion resistant vinyl with a woven rip-stop base fabric for tear resistance and tensile strength to resistant to punctures, resistant to zipper tears, and promote safety, said flexible protective cover being treated with UV and anti-mildew to resist color fading and degradation, while resisting mold and mildew.

\* \* \* \* \*